(12) United States Patent
Friedrich et al.

(10) Patent No.: US 7,644,305 B2
(45) Date of Patent: Jan. 5, 2010

(54) QUORUM ESTABLISHMENT BASED ON A VOTE FROM A VOTING DEVICE

(75) Inventors: Kurt Lawrence Friedrich, Woodinville, WA (US); David Allen Dion, Bothell, WA (US); Rajsekhar Das, Kirkland, WA (US); Gregory I. Thiel, Black Diamond, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 11/419,118

(22) Filed: May 18, 2006

(65) Prior Publication Data

US 2007/0294363 A1 Dec. 20, 2007

(51) Int. Cl.
*G06F 11/00* (2006.01)
(52) U.S. Cl. ........................................................ 714/11
(58) Field of Classification Search .................... 714/4, 714/11; 709/201, 220
See application file for complete search history.

(56) References Cited

U.S. PATENT DOCUMENTS 5,948,109 A 9/1999 Moiin et al.

(Continued)

FOREIGN PATENT DOCUMENTS

EP 1 107 119 A2 6/2001

OTHER PUBLICATIONS

Divyakant Agrawal and Amr El Abbadi; An Efficient Solution to the Distributed Mutual Exclusion Problem (Preliminary Report); Department of Computer Science; University of California, Santa Barbara, CA 93106 http://delivery.acm.org/10.1145/80000/72994/p193-agrawal.pdf?key1=72994&key2=8278691411&coll=GUIDE&dl=GUIDE&CFID=70994238&CFTOKEN=35337972.

(Continued)

*Primary Examiner*—Robert Beausoliel
*Assistant Examiner*—Charles Ehne (57) ABSTRACT

A cluster system including as few as two cluster nodes and a plurality of links, each one of the plurality of links coupling one of the cluster nodes to a voting device wherein a single surviving cluster node obtain a vote from the voting device. A method of establishing quorum in a cluster system including as few as two cluster nodes, the method comprising determining a single surviving cluster node of the as few as two cluster nodes, obtaining a vote from a voting device, and establishing quorum such that cluster operations are continued by the single surviving cluster node. A method for preventing a partition-in-time quorum establishment problem in a cluster system including as few as two cluster nodes, the method comprising determining that a revived cluster node is also a sole active cluster node of the cluster system, checking a last-surviving flag of the sole active cluster node, and if the last-surviving flag is set to FALSE, not restarting cluster operations.

19 Claims, 7 Drawing Sheets

U.S. PATENT DOCUMENTS

| | | | |
|---|---|---|---|
| 6,314,526 | B1 | 11/2001 | Arendt et al. |
| 6,453,426 | B1 | 9/2002 | Gamache et al. |
| 6,487,622 | B1 | 11/2002 | Coskrey et al. |
| 6,782,416 | B2 | 8/2004 | Cochran et al. |
| 6,859,811 | B1 | 2/2005 | Chandrasekaran et al. |
| 6,915,391 | B2 * | 7/2005 | Wang-Knop et al. ........ 711/150 |
| 6,938,084 | B2 | 8/2005 | Gamache et al. |
| 7,016,946 | B2 * | 3/2006 | Shirriff ....................... 709/221 |
| 7,107,491 | B2 * | 9/2006 | Graichen et al. ............... 714/37 |
| 2003/0023680 | A1 * | 1/2003 | Shirriff ....................... 709/204 |
| 2004/0215614 | A1 | 10/2004 | Doyle et al. |
| 2005/0262382 | A1 | 11/2005 | Bain |
| 2006/0041778 | A1 * | 2/2006 | Lizzi et al. ..................... 714/4 |
| 2006/0041779 | A1 * | 2/2006 | McKinty et al. ............... 714/4 |

OTHER PUBLICATIONS

David K. Gifford; Weighted Voting for Replicated Data; Stanford University and Xerox Palo Alto Research Center http://delivery.acm.org/10.1145/810000/806583/p150-gifford.pdf?key1=806583&key2=2380791411&coll=GUIDE&dl=GUIDE&CFID=70994238&CFTOKEN=35337972.

A. Kumar; Hierarchical Quorum Consensus: A New Algorithm for Managing Replicated Data; IEEE Transactions on Computers http://csd12.computer.org/persagen/DLAbsToc.jsp?resourcePath=/dl/trans/tc/&toc=comp /trans/tc/1991/09/t9toc.xml&DOI=10.1109/12.83661.

Microsoft Clustering for Exchange 2003, Including HP Cluster Extension EVA White Paper.

* cited by examiner

United States Patent US 7,644,305 B2

QUORUM ESTABLISHMENT BASED ON A VOTE FROM A VOTING DEVICE

TECHNICAL FIELD

The present invention relates to clustering—the grouping of multiple servers or systems in a way that allows them to appear to be a single unit to client computers on a common network. The servers that make up a cluster may be geographically distributed and are commonly referred to as cluster nodes or cluster members. More particularly, the present invention relates to establishing quorum by obtaining a vote from an external device when cluster nodes are geographically distributed and when the cluster is comprised of as few as two nodes.

BACKGROUND

A cluster is typically used to provide a very high degree of availability for computing services. A cluster is typically comprised of several nodes among which "quorum" must exist. Quorum is a concept that is employed to enforce one, and only one, official cluster membership of nodes. Restricting quorum to only one collection of cluster nodes prevents a cluster from partitioning into multiple collections of nodes, each operating without the knowledge of the others. The danger is that these disjoint collections may result in unsynchronized access to cluster data and services and lead to data corruption.

A cluster is said to "have quorum" when there are sufficient cluster nodes that have the same view of the current state of the cluster validated by being able to communicate among one another. From the perspective of an application or an end user, quorum must be maintained in order for the application to function properly. If the cluster loses quorum, the cluster will typically seek to re-establish quorum and, if unable, shut down, terminating the applications under its control.

One common method of establishing quorum is to ensure that a simple majority (i.e., at least one more than 50%) of cluster member nodes are able to communicate with each other. Since there can be only one simple majority in a cluster, quorum ownership by one and only one group of cluster member nodes is guaranteed. Other methods may also be used to establish and maintain quorum.

It is increasingly common to geographically distribute the nodes of a cluster over long distances in an effort to minimize the loss of cluster services as a result of catastrophic failures, such as large-scale/long-term power failures, natural disasters such as earthquake or flood, and the like. For example, a company may establish a cluster providing critical computing services and physically locate one portion of the cluster nodes on the United States east coast, another portion on the west coast, and yet another portion in the central states. Such a geographically distributed cluster tends to minimize loss of availability of cluster services even in the event of significant disasters. Deploying the nodes of such a geographically distributed cluster, as well as the communication pathways between the nodes, can be expensive.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for the establishment of quorum in a cluster comprised of as few as two nodes by obtaining a vote from an external device, or devices within a common network safe zone.

Many of the attendant features will be more readily appreciated as the same becomes better understood by reference to the following detailed description considered in connection with the accompanying drawings.

DESCRIPTION OF THE DRAWINGS

The present invention and examples will be better understood from the following detailed description read in light of the accompanying drawings, wherein.

Like reference numerals are used to designate like elements in the accompanying drawings.

DETAILED DESCRIPTION

The detailed description provided below in connection with the appended drawings is intended as a description of the present invention and examples and is not intended to represent the only forms in which the present invention may be constructed or utilized. The description sets forth the functions of the invention and the sequence of steps for constructing and operating the examples. However, the same or equivalent functions and sequences may be accomplished by different examples.

Although the present examples are described and illustrated herein as being implemented in a computing and networking system, the system described is provided as an example and not a limitation. As those skilled in the art will appreciate, the present examples are suitable for application in a variety of different types of computing and networking systems.

Figure 1:
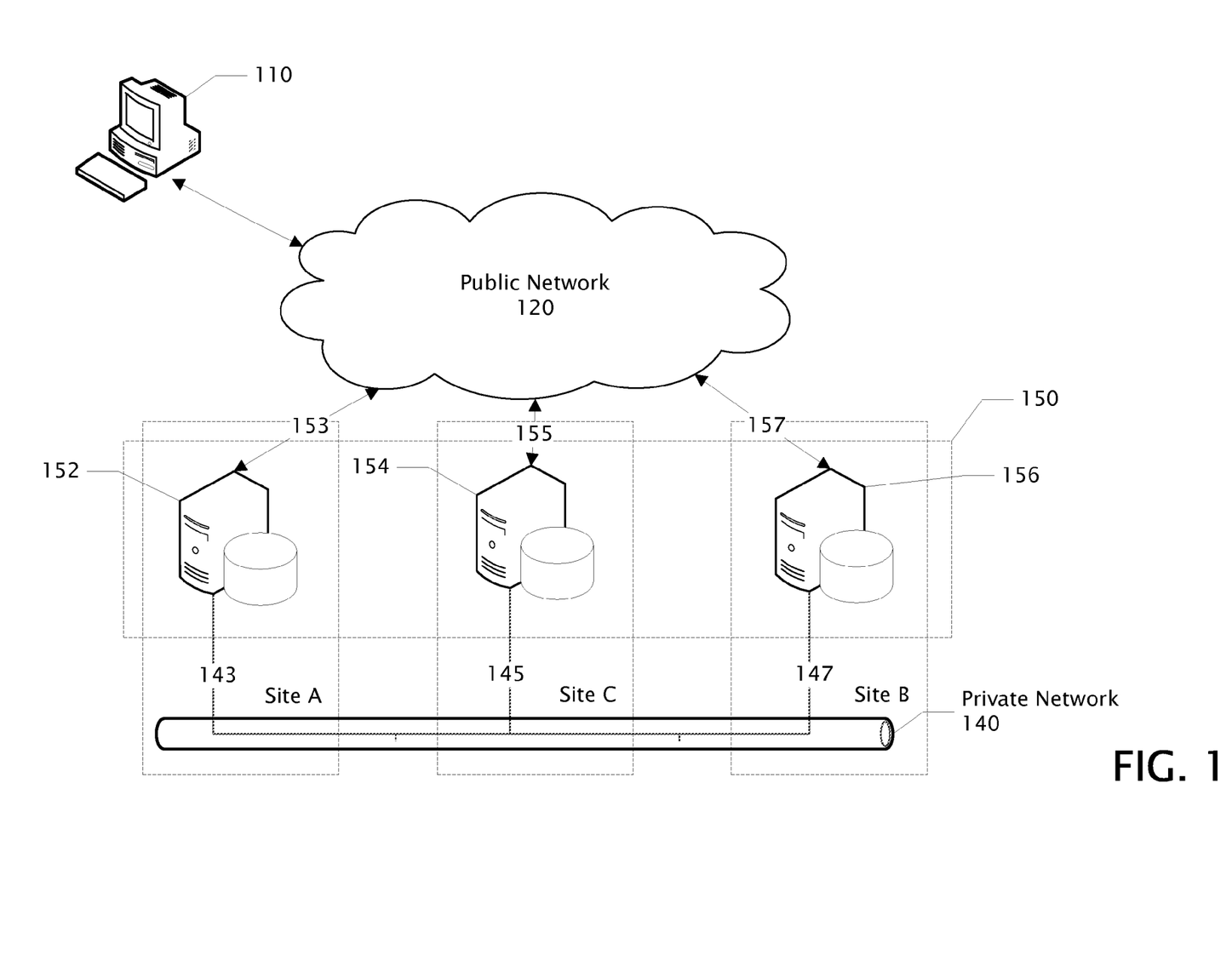
FIG. 1 is a block diagram showing an example of a typical cluster providing services to a client over a network.

FIG. 1 is a block diagram showing an example of a typical cluster providing services to a client over a network. Example cluster 150 is comprised of cluster nodes, such as nodes 152, 154, and 156, with each node shown physically located in a separate geographic location, Site A, Site C, and Site B respectively. Example cluster nodes 152, 154, and 156 are shown coupled via private network 140 via connections 143, 145, and 147 respectively. Example cluster nodes are also shown coupled via connections 153, 155, and 157 to public network 120, over which example client 110 may access cluster services. "Cluster services" may be any type of computing resource, such as an Internet site and functionality, an application, data storage, or any other type of computing resource.

"Public network" 120 may be the Internet, a corporate network, or any other network over which a client may access cluster 150. "Private network" 140 may be any type of network typically providing a reliable communications pathway between the nodes of cluster 150. In some examples, public network 120 and private network 140 may be the same network. The term "pathway" as used herein is defined as a communications route, or communications link, between nodes in a network. Such a pathway may be dynamic in that the exact route between nodes may change over time.

As used herein, the term "node" refers to any computer system, device, system, or process that is uniquely addressable, or otherwise uniquely identifiable, in (or coupled to) a network and that is operable to communicate with other nodes in the network. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a cluster, a specific service operating on a node, or the like. An example of a node, in the form of computing environment 700, is set forth below with respect to FIG. 7.

Example nodes 152, 154, and 156 are each shown to include a database comprising cluster data. In other examples, cluster data may be distributed in other ways and/or be present on other devices associated with the cluster.

Figure 2:
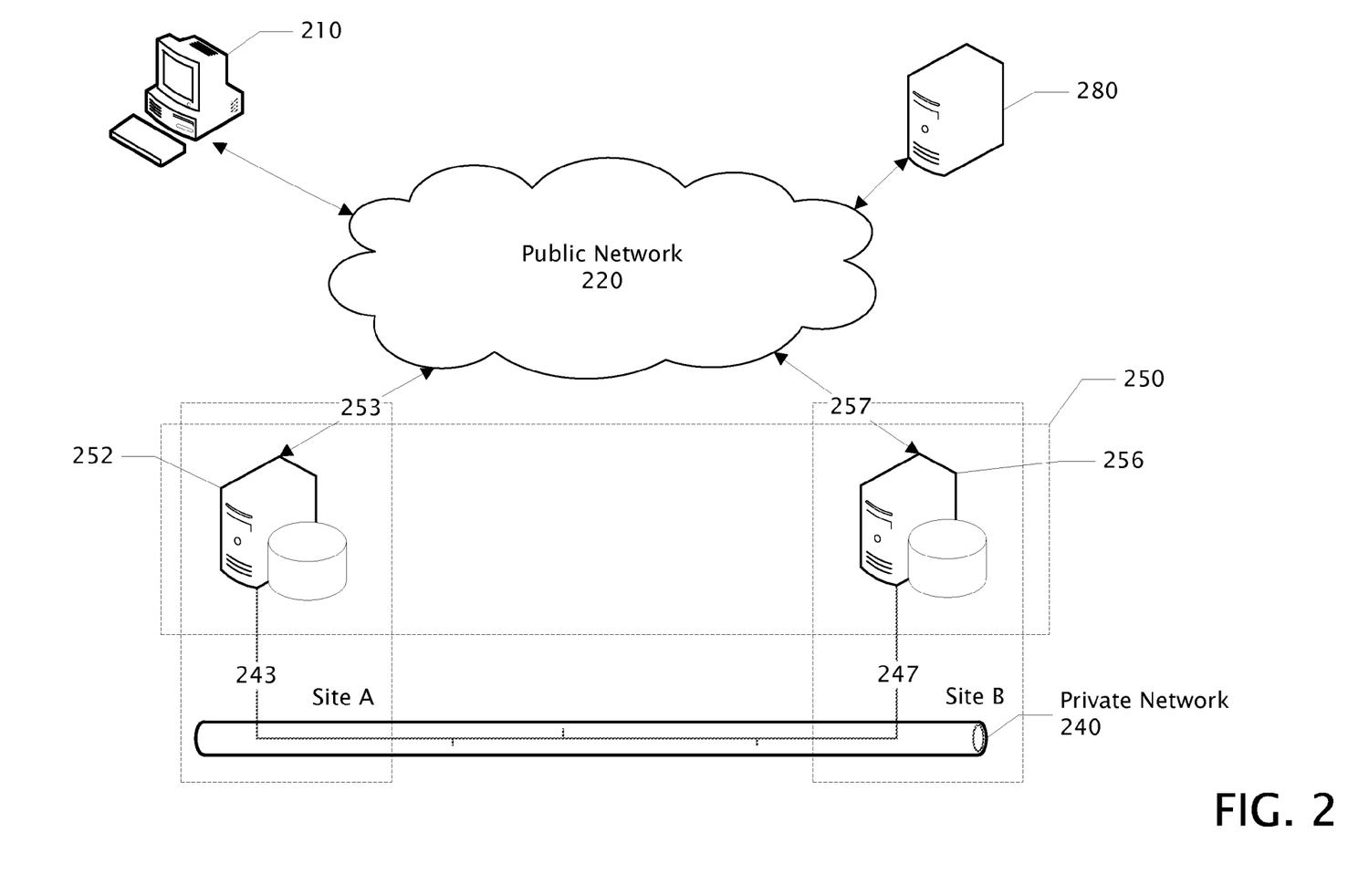
FIG. 2 is a block diagram showing an example cluster comprised of as few as two nodes.

FIG. 2 is a block diagram showing an example cluster comprised of as few as two nodes. Example cluster 250 is shown comprised of node 252 located at Site A and node 256 located at Site B. Nodes 252 and 256 are coupled via private network 240 via links 243 and 247 respectively. Nodes 252 and 256 are also coupled via links 253 and 257 respectively to public network 220, via which client 210 may access cluster services. Links 243, 247, 253, and 257 may be network interface cards ("NICs") or the like coupled via hubs, routers, switches, and the like to networks 220 and 240. Public network 220 and private network 240 may be the same network or separate networks. Client 210 represents any number of clients of the cluster services. Nodes 252 and 256 include a "last-surviving" flag or the like that is normally set to FALSE to indicate that a node is not the last surviving node of a cluster. When a node determines it is the last surviving node of a cluster, it typically sets its last-surviving flag to TRUE. Other equivalent mechanisms may alternatively be used to determine and/or indicate if a particular node is the last surviving node of a cluster.

For clusters that have only two nodes, if they cannot communicate with each other, it may be impossible for one node to distinguish between a failure of the other node and a failure of the coupling network(s). For example, if node 252 loses contact with node 256, then node 252 may not be able to determine whether node 256 has crashed, or is simply unable to communicate due to a network failure. In this scenario the cluster generally terminates operation. The present invention and examples provide technology that enables a single surviving node in a cluster with a few as two nodes to continue cluster operations by, at least in part, obtaining a vote from an external device.

In one example, voting device 280 provides a vote allowing a single surviving node to continue cluster operations. Voting device 280 may be any device or system capable of network communications with the surviving node including, but not limited to, a computing environment such as that described in connection with FIG. 7. For example, voting device 280 may be a server, public website, computer, router, network switch, or any other type of device coupled to public network 220 and capable of communicating with the nodes of cluster 250 including a last surviving node. Voting device 280 need not be related to cluster 250 in any way, other than being able to communicate with the nodes of cluster 250. In one example, the nodes of cluster 250 periodically communicate with voting device 280 to insure an on-going ability to obtain a vote.

The "vote" provided by voting device 280 is defined as the ability of a surviving cluster node to confirm contact with voting device 280. In one example, confirmed contact may be obtained via a ping response or a connection request response or any other type of recognized response to a contact attempt by a surviving node. There does not need to be a pre-designated master node—regardless of which node 252 or 256 is the last surviving node, the surviving node may attempt to obtain such a vote from voting device 280. A surviving node may use a uniform resource locator ("URL") or any other mechanism to address and communicate with voting device 280 in the contact attempt. Care should be taken to ensure that caching does not result in a simulated contact response in the place of an actual contact response.

Voting device 280 may be entirely "stateless"—that is, no specific information or data need be sent to voting device 280 in a contact attempt (other than basic protocol and addressing information as required to communicate), or stored by voting device 280, or exchanged between a surviving node and voting device 280. Quorum is determined merely by the surviving node successfully obtaining a vote from voting device 280.

Voting device 280 may be further defined as any device or collection of devices, related or not, capable of providing votes from within a "safe zone" in public network 220. A safe zone is defined as any portion of a network that provides sufficient redundant pathways that it is statistically unlikely that any two devices within the safe zone become unable to communicate due to network failures. For example, public network 220 may include web server A ("WSA") and web server B ("WSB"). WSA and WSB may be coupled to each other via many redundant pathways of public network 220, and may not be related to each other in any other manner. Thus is may be statistically very unlikely (i.e., less than 1% probability at any particular point in time) that WSA and WSB not be able to communicate with each other due to failures within public network 220. As such, voting devices WSA and WSB are considered to be within a safe zone.

Given such a safe zone, node 252, if the last surviving node of cluster 250, may attempt to obtain a vote from WSA, for example, while node 256, if the last surviving node, may attempt to obtain a vote from WSB. Cluster nodes such as nodes 252 and 256 may attempt to obtain votes from any voting device in a common safe zone (a safe zone common to nodes 252 and 156 of cluster 250)—the voting devices such as WSA ands WSB need not be the same voting device used by both nodes or over time by the same node, so long as the voting devices are in a common safe zone.

Figure 3:
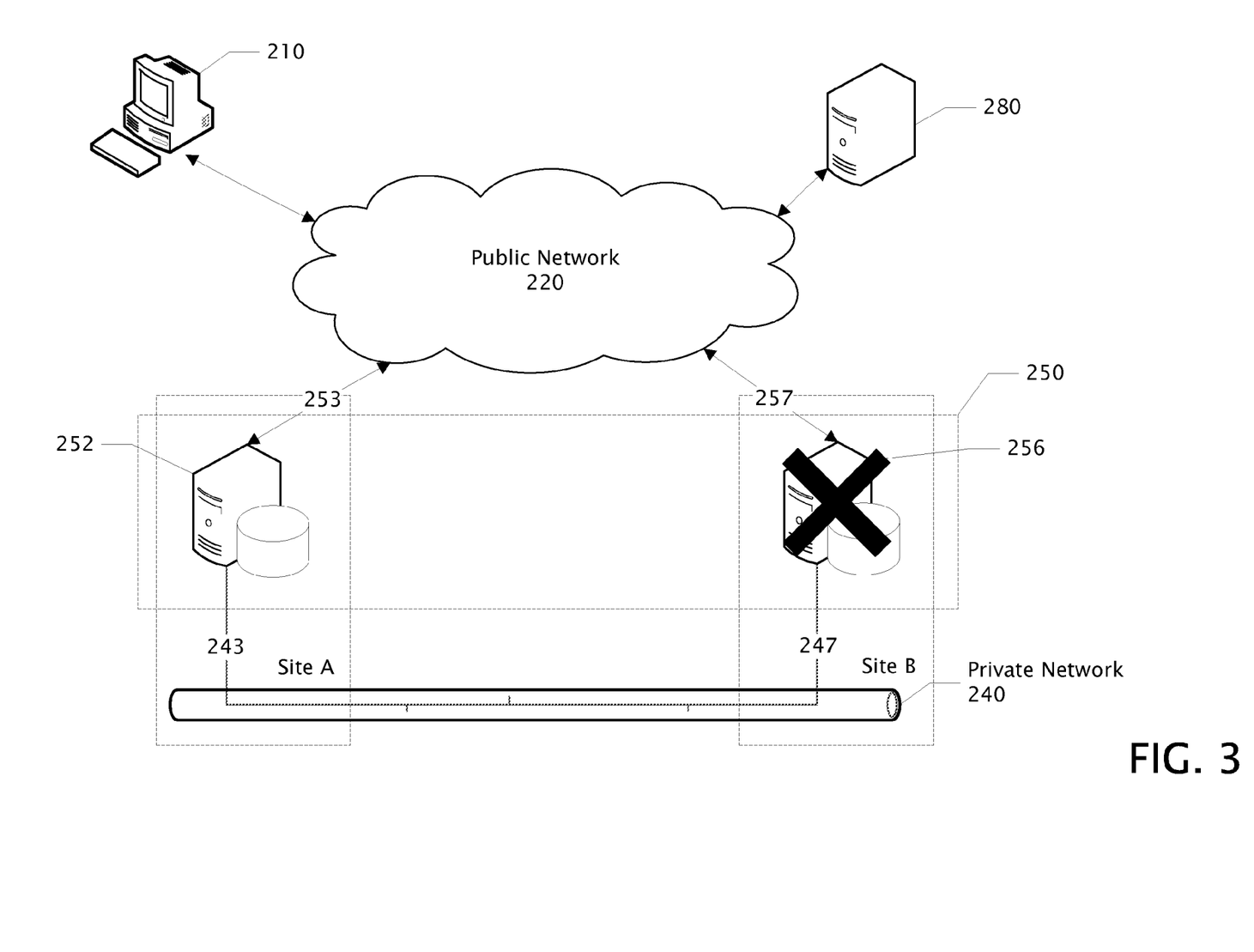
FIG. 3 is a block diagram showing the example cluster of FIG. 2 including a node failure.

FIG. 3 is a block diagram showing the example cluster of FIG. 2 including a node failure. As indicated by the 'X' in FIG. 3, node 256 is shown to have failed or unable to properly communicate or the like. In this scenario, node 252 detects that node 256 has failed. Node 252 becomes the last surviving node and sets its last-surviving flag to TRUE. Node 252 attempts to obtain a vote from voting device 280, acquires quorum upon success, and continues cluster operations.

Figure 4:
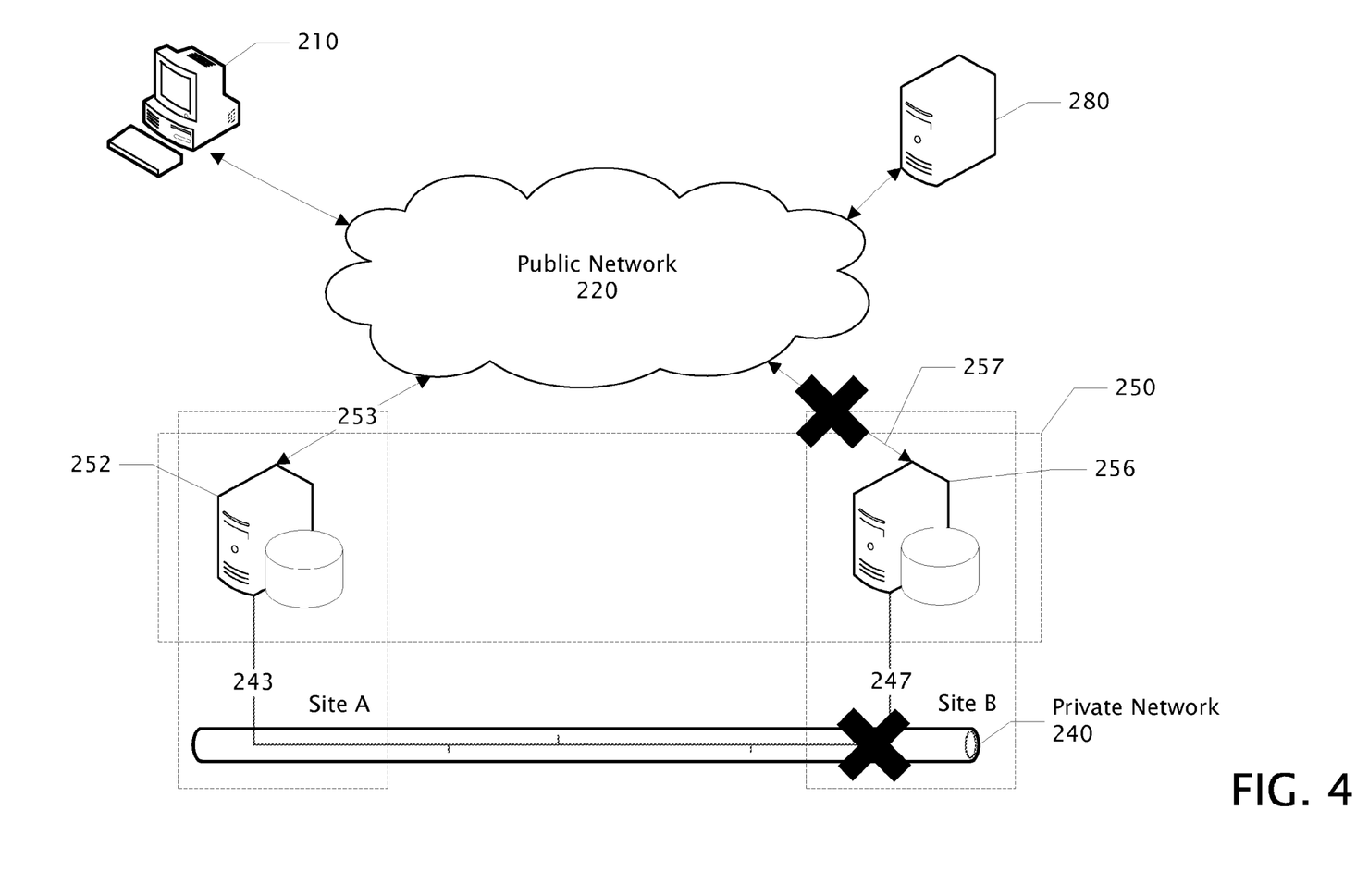
FIG. 4 is a block diagram showing the example cluster of FIG. 2 including a communications failure.

FIG. 4 is a block diagram showing the example cluster of FIG. 2 including a communications failure. As indicated by the two 'X's in FIG. 4, communications links 257 and 247 have failed such that node 256 is unable to communicate with the other cluster nodes and voting device 280. In this scenario, if node 256 was participating in cluster operations prior to the link failures, because node 256 is unable to communicate with the other cluster nodes due to the link failures, node 252 will attempt to obtain a vote from voting device 280 and continue cluster operations as the last surviving node.

In a related example, if link 247 had not failed as shown, then nodes 252 and 256 would still be able to communicate over private network 240 even though node 256 cannot communicate with voting device 280 due to the link 257 failure. In this scenario, if node 256 was participating in cluster operations, it will continue to do so, or if node 252 was participating in cluster operations, it will continue to do so.

Figure 5:
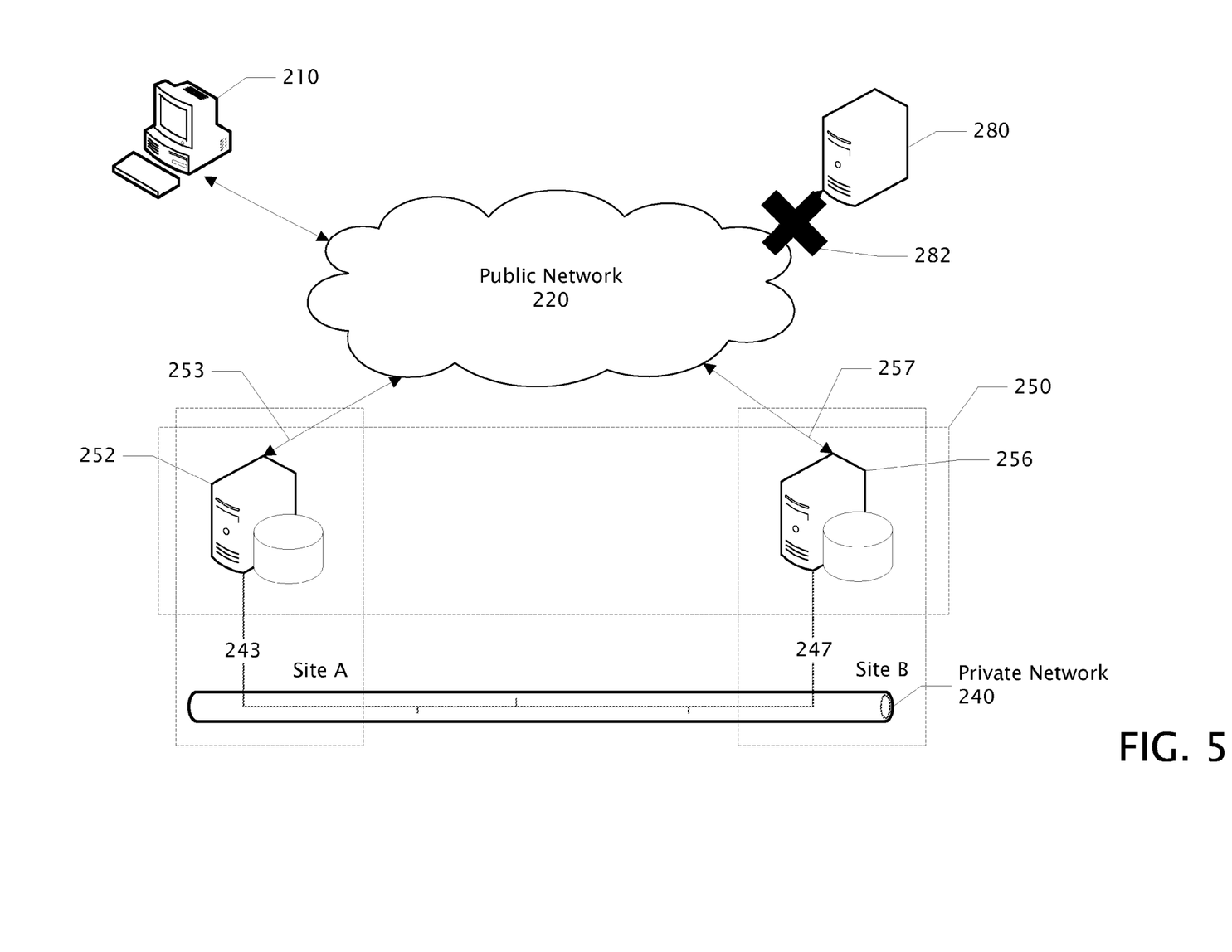
FIG. 5 is a block diagram showing the example cluster of FIG. 2 including an inability for all cluster nodes to communicate with a voting device.

FIG. 5 is a block diagram showing the example cluster of FIG. 2 including an inability for all cluster nodes to communicate with a voting device. As indicated by the 'X' in FIG. 5, communications between cluster 250 and voting device 280 have failed such that neither node 252 nor node 256 can obtain a vote. Such a failure may occur due to failure of voting device 280 itself, or failure of the communication links and/or pathways coupling voting device 280, and/or nodes 252 and 256 to public network 220, or the like. In this scenario, cluster 250 typically continues operations as normal even though neither cluster node is able to obtain a vote from voting device 280 so long as nodes 252 and 256 are able to communicate.

In a related example, if communication with voting device 280 fails and all communication between nodes 252 and 256 also fails, then cluster 250 typically shuts down operations. Communications between nodes 252 and 256 may fail due to a network or link problem or the like, or because one or both of the nodes themselves fails.

Figure 6:
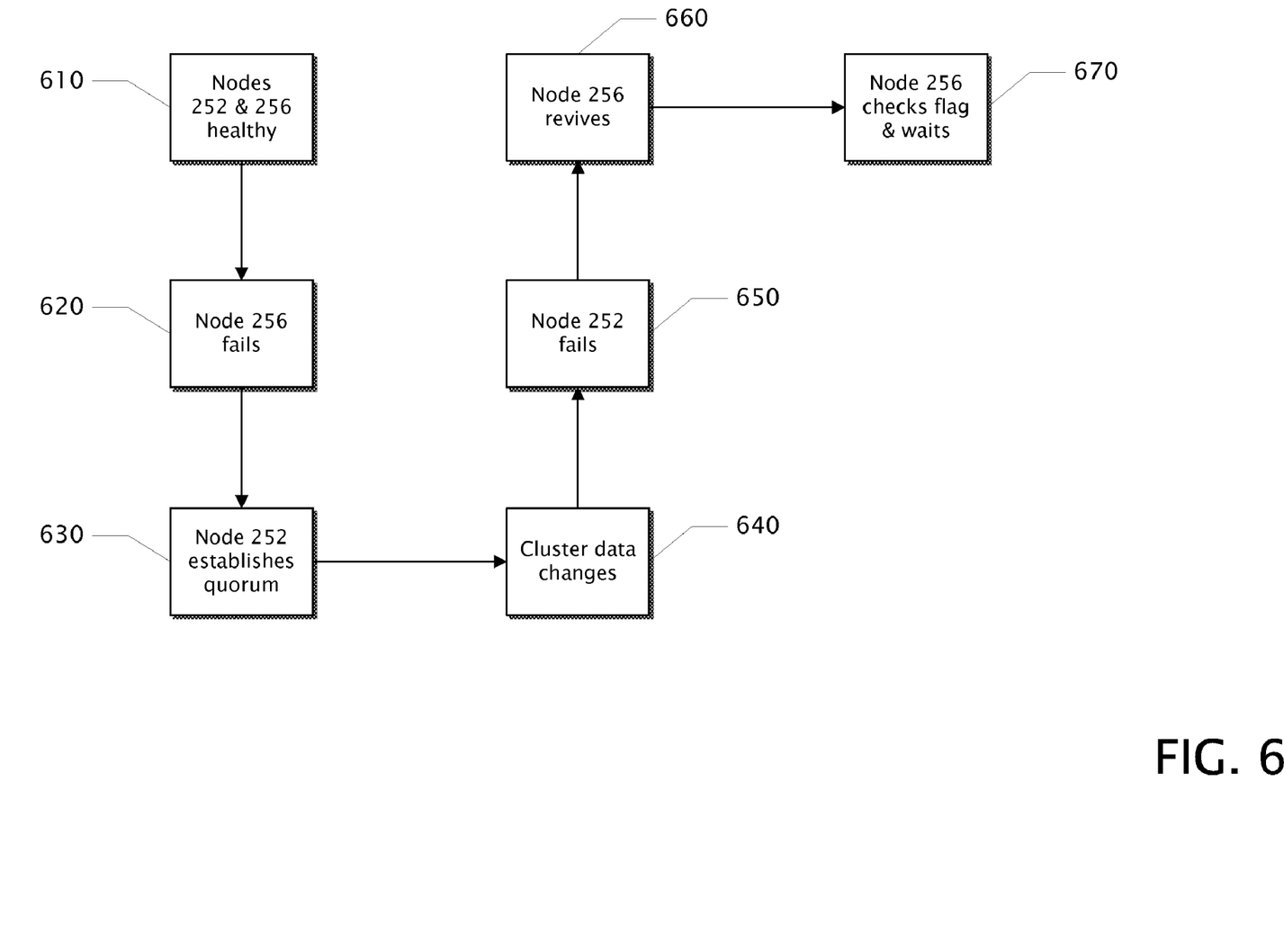
FIG. 6 is a block diagram showing an example of how to prevent a partition-in-time scenario.

FIG. 6 is a block diagram showing an example of how to prevent a partition-in-time scenario. Using the example cluster shown in FIG. 2, the scenario begins, as indicated in block 610, with both nodes 252 and 256 of cluster 250 operational, each with their last-surviving flags set to FALSE (neither node is currently the last surviving node), and with node 256 continuing cluster operations.

Later, as indicate by block 620, node 256 fails as described in connection with FIG. 3. Node 252 detects the failure, determines it is the last surviving node of cluster 250.

As indicated by block 630, node 252 successfully obtains a vote from voting device 280, establishes quorum, sets its last-surviving flag to TRUE, and cluster 250 continues operation. In another example, node 252 may set its last-surviving flag before obtaining a vote rather than after.

Over time, as indicated by block 640, the state of cluster 250 changes as a result of typical cluster operations.

Later, as indicated by block 650, last surviving node 252 fails and cluster 250 ceases operations.

Later, as indicated by block 660, node 256 revives operations and determines it is unable to communicate with node 252. Note that node 256 is unaware of the cluster state changes indicate by block 640 that occurred when it was not operational.

At this point in the scenario, as indicated by block 670, node 256 checks its last-surviving flag and finds it set to FALSE, indicating that node 256 is not the last surviving node of cluster 250. Therefore node 256 does not resume cluster operations, which prevents a partition-in-time scenario. Node 256 instead waits until cluster operations have been restarted, typically by the last surviving node, and then rejoins cluster operations. For example, because node 252 was the last surviving node as described above with its last-surviving flag set to TRUE, when node 252 revives it will re-establish quorum and cluster operations. Once node 256 detects normal cluster operations it rejoins cluster operations and then node 252 sets its last-surviving flag to FALSE.

Figure 7:
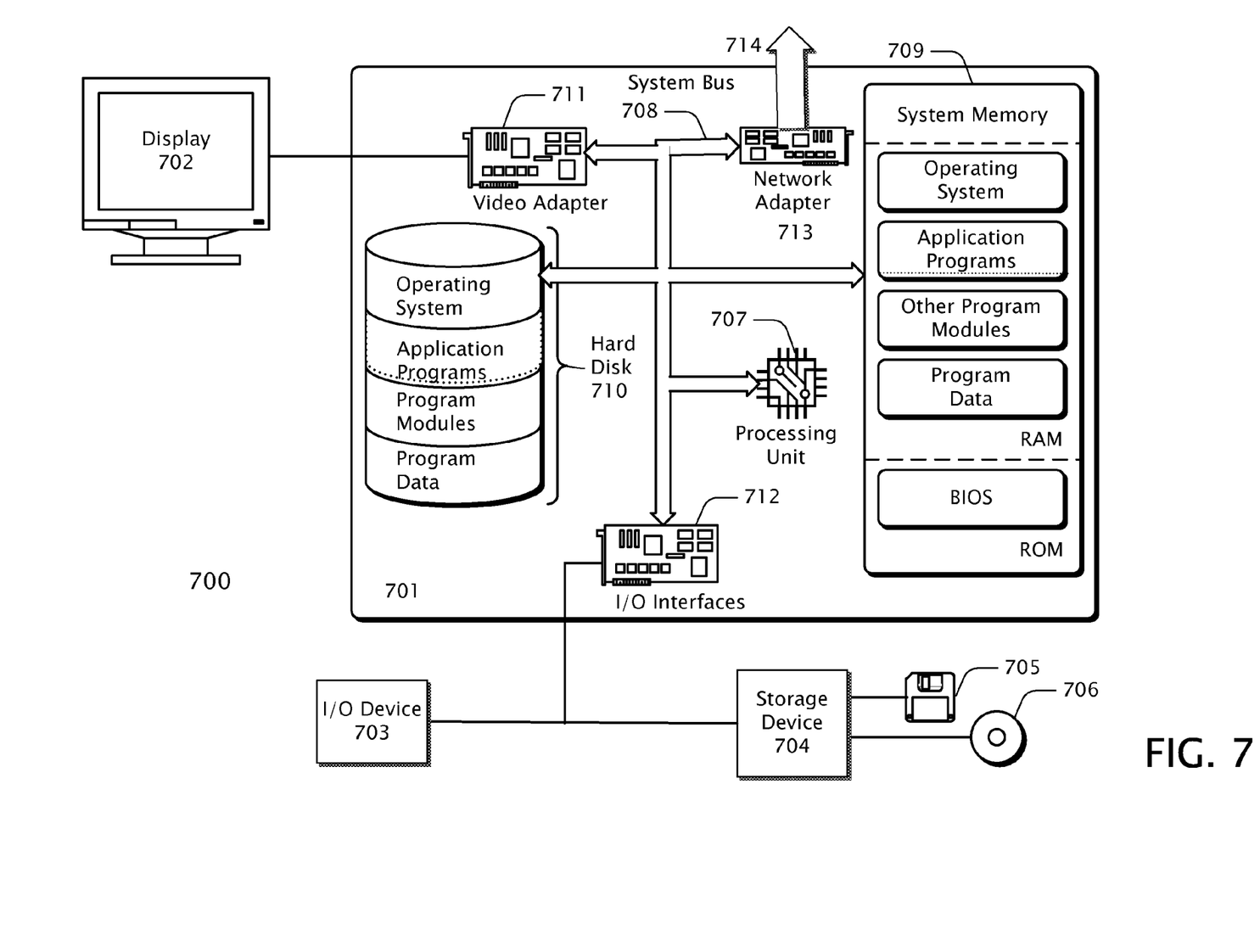
FIG. 7 is a block diagram showing an exemplary computing environment in which the technologies, processes, systems and methods described herein may be implemented.

FIG. 7 is a block diagram showing an exemplary computing environment 700 in which the technologies, processes, systems and methods described herein may be implemented. A suitable computing environment may be implemented with numerous general purpose or special purpose systems. Examples of well known systems may include, but are not limited to, personal computers ("PC"), hand-held or laptop devices, microprocessor-based systems, multiprocessor systems, servers, workstations, consumer electronic devices, set-top boxes, and the like.

Computing environment 700 generally includes a general-purpose computing system in the form of a computing device 701 coupled to various peripheral devices 702, 703, 704 and the like. System 700 may couple to various input devices 703, including keyboards and pointing devices, such as a mouse or trackball, via one or more I/O interfaces 712. The components of computing device 701 may include one or more processors (including central processing units ("CPU"), graphics processing units ("GPU"), microprocessors ("uP"), and the like) 707, system memory 709, and a system bus 708 that typically couples the various components. Processor 707 typically processes or executes various computer-executable instructions to control the operation of computing device 701 and to communicate with other electronic and/or computing devices, systems or environment (not shown) via various communications connections such as a network connection 714 or the like. System bus 708 represents any number of several types of bus structures, including a memory bus or memory controller, a peripheral bus, a serial bus, an accelerated graphics port, a processor or local bus using any of a variety of bus architectures, and the like.

System memory 709 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 709 typically stores data, computer-executable instructions and/or program modules comprising computer-executable instructions that are immediately accessible to and/or presently operated on by one or more of the processors 707.

Mass storage devices 704 and 710 may be coupled to computing device 701 or incorporated into computing device 701 via coupling to the system bus. Such mass storage devices 704 and 710 may include a magnetic disk drive which reads from and/or writes to a removable, non-volatile magnetic disk (e.g., a "floppy disk") 705, and/or an optical disk drive that reads from and/or writes to a non-volatile optical disk such as a CD ROM, DVD ROM 706. Alternatively, a mass storage device, such as hard disk 710, may include non-removable storage medium. Other mass storage devices may include memory cards, memory sticks, tape storage devices, and the like.

Any number of computer programs, files, data structures, and the like may be stored on the hard disk 710, other storage devices 704, 705, 706 and system memory 709 (typically limited by available space) including, by way of example, operating systems, application programs, data files, directory structures, and computer-executable instructions.

Output devices, such as display device 702, may be coupled to the computing device 701 via an interface, such as a video adapter 711. Other types of output devices may include printers, audio outputs, tactile devices or other sensory output mechanisms, or the like. Output devices may enable computing device 701 to interact with human operators or other machines or systems. A user may interface with computing environment 700 via any number of different input devices 703 such as a keyboard, mouse, joystick, game pad, data port, and the like. These and other input devices may be coupled to processor 707 via input/output interfaces 712 which may be coupled to system bus 708, and may be coupled by other interfaces and bus structures, such as a parallel port, game port, universal serial bus ("USB"), fire wire, infrared port, and the like.

Computing device 701 may operate in a networked environment via communications connections to one or more remote computing devices through one or more local area networks ("LAN"), wide area networks ("WAN"), storage area networks ("SAN"), the Internet, radio links, optical links and the like. Computing device 701 may be coupled to a network via network adapter 713 or the like, or, alternatively, via a modem, digital subscriber line ("DSL") link, integrated services digital network ("ISDN") link, Internet link, wireless link, or the like.

Communications connection 714, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, communications media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A cluster system comprising:
as few as two cluster nodes wherein each of the as few as two cluster nodes includes a last-surviving flag that, when set to TRUE, indicates that the corresponding cluster node is a last surviving node of the cluster system, and wherein the as few as two cluster nodes are communicatively coupled by a plurality of links, at least one of the plurality of links communicatively coupling one of the as few as two cluster nodes to a voting device wherein a single surviving cluster node of the as few as two cluster nodes that is the one of the as few as two cluster nodes obtains a vote from the voting device, and wherein the vote from the voting device is defined as the single surviving cluster node confirming communicative contact with the voting device.

2. The cluster system of claim 1 wherein the single surviving node is indicated by its last-surviving flag being set to TRUE.

3. The cluster system of claim 1 wherein the voting device is unrelated to the cluster system other than by being able to communicate with the as few as two cluster nodes and provide the vote.

4. The cluster system of claim 1 wherein the voting device is two or more devices within a safe zone wherein the safe zone is a portion of a network that provides sufficient redundant pathways between the two or more devices that it is statistically unlikely that the two or more devices become unable to communicate with each other due to network failures, wherein statistically unlikely is defined as less than a 1% probability.

5. The cluster system of claim 1 wherein the single surviving cluster node continues cluster operations after obtaining the vote from the voting device.

6. The cluster system of claim 1 wherein the as few as two cluster nodes are geographically distributed.

7. A method of establishing quorum in a cluster system including as few as two cluster nodes, the method comprising:
determining a single surviving cluster node of the as few as two cluster nodes wherein each of the as few as two cluster nodes includes a last-surviving flag that, when set to TRUE, indicates that the corresponding cluster node is a last surviving node of the cluster system;
obtaining a vote from a voting device wherein the vote from the voting device is defined as the single surviving cluster node confirming contact with the voting device; and
establishing quorum such that cluster operations are continued by the single surviving cluster node.

8. The method of claim 7 further comprising setting the last-surviving flag of the single surviving cluster node to TRUE.

9. The method of claim 7 wherein the voting device is unrelated to the cluster system other than by being able to communicate with the as few as two cluster nodes and provide the vote.

10. The method of claim 7 wherein the vote is a response from the voting device responsive to a contact attempt by the single surviving cluster node.

11. The method of claim 7 wherein the voting device is one or more devices within a safe zone.

12. The method of claim 7 wherein the as few as two cluster nodes are geographically distributed.

13. The method of claim 7 wherein the voting device is a web server.

14. The method of claim 7 wherein the vote is obtained using a uniform resource locator associated with the voting device.

15. The method of claim 7 embodied as computer-executable instructions on computer-readable media.

16. The method of claim 7 wherein the as few as two cluster nodes are coupled to the voting device via the Internet.

17. A method for preventing a partition-in-time quorum establishment problem in a cluster system including as few as two cluster nodes, the method comprising:

determining that a revived cluster node of the as few as two cluster nodes is also a sole active cluster node of the cluster system, wherein each of the as few as two cluster nodes includes a last-surviving flag that, when set to TRUE, indicates that the corresponding cluster node is a last surviving node of the cluster system;

checking the last-surviving flag of the sole active cluster node; and if the last-surviving flag of the sole active cluster node is set to FALSE, not restarting cluster operations.

18. The method of claim 17 embodied as computer-executable instructions on computer-readable media.

19. The method of claim 17 further comprising joining the revived cluster node to cluster operations after a second cluster node of the as few as two cluster nodes, the second cluster node including a last-surviving flag previously set to TRUE, restarts cluster operations.

* * * * *